March 2, 1943.  A. J. HERZENBERG  2,312,642
SEISMIC EXPLORATION METHOD
Filed March 29, 1941   2 Sheets-Sheet 1

Inventor: Alfred J. Herzenberg
By his Attorney:

March 2, 1943.  A. J. HERZENBERG  2,312,642
SEISMIC EXPLORATION METHOD
Filed March 29, 1941  2 Sheets—Sheet 2

Inventor: Alfred J. Herzenberg
By his Attorney:

Patented Mar. 2, 1943

2,312,642

UNITED STATES PATENT OFFICE 2,312,642

SEISMIC EXPLORATION METHOD

Alfred J. Herzenberg, Houston, Tex., assignor to Shell Development Company, San Francisco, Calif., a corporation of Delaware Application March 29, 1941, Serial No. 385,961

6 Claims. (Cl. 177—352)

This invention pertains to seismic exploration methods, and relates more specifically to a seismograph system in which the electrical oscillations or impulses generated by detectors or seismometers in response to mechanical disturbances in the ground are passed to amplifying and recording devices through a transmission circuit having variable non-linear resistance characteristics, whereby the voltage or amplitude level of said oscillations is suitably controlled.

Seismic exploration provides means for surveying geological formations and determining the oriented location of underground strata with a view to locating structures favorable to the accumulation of valuable deposits, such as mineral oil.

In seismic methods of exploration, a disturbance artificially generated in the ground, for example, by means of an explosive charge, is transmitted in the form of ground waves to a plurality of detectors or seismometers wherein the mechanical energy of the ground vibrations or waves is translated into electrical impulses, which are then transmitted to a galvanometer or recorder capable of registering or photographically recording said impulses in the form of seismograms. Suitable amplifiers are usually interposed between the detector and the recorder.

The oscillations or impulses thus recorded are valuable for the purposes of geological interpretation, and it is therefore desirable that they be clearly decipherable on the seismograms.

However, the intensity of the ground waves reaching the detectors is subject to great variations, being a function, among other factors, of the length of their travel path from the origin of the disturbance to the detectors.

In particular, in using the so-called seismic reflection method, the recorder receives from the detectors and records, first, the impulses generated by seismic waves which have travelled either substantially in a straight line from the origin of the disturbance to the detectors, or by a shorter time path, if such exists, without in either event penetrating deeply into the ground. Impulses progressively later to arrive at the detector may have been generated by waves which followed increasingly longer paths downward into the ground, and suffered reflection by a subsurface layer or layers before reaching the detectors.

Since the amount of energy delivered to the detectors by the impulses travelling along substantially direct or minimum time paths, and by impulses reflected from shallow depths is very much greater than that delivered by reflected impulses from greater depths, considerable difficulties are encountered in finding a suitable method for recording the volume of these various impulses in such a manner as to produce substantially equal amplitudes throughout the length of a seismogram, which is desirable in order to render all impulses equally decipherable.

Thus, if a sufficiently low volume amplification is used to permit the recorded oscillations due to substantially direct and/or refracted impulses to remain within the limits of the seismogram track assigned to them, the reflected impulses are not amplified in a sufficient measure to permit a desired detailed study and interpretation thereof.

If, on the other hand, a volume amplification is used which is sufficiently high to give a graph record of reflected impulses having a proper amplitude, that part of the seismogram in which the substantially direct and/or refracted wave oscillations are recorded becomes, especially in multi-element recorders, entirely illegible and meaningless due to the repeated crossing and mixing of the several graph lines.

Various methods have therefore been proposed for varying or controlling the amplification of the detector impulses in such a manner as to suitably suppress on the record track the undesirably large oscillation amplitudes due to strong impulses while preserving or enhancing the effect of the weak impulses. Such methods may involve, for example, the use of control circuits wherein the amplification gain of the amplifiers is varied as a function of time, or the use of so-called automatic control circuits wherein the amplification gain is varied at any given moment as a function of the intensity or amplitude of the electrical impulses generated by the detectors during a preceding short time interval.

None of these methods is, however, entirely free of drawbacks. Thus, with the time-responsive systems, a particular control-circuit setting must be selected by the operator for each separate case, whereby a human error factor is introduced into the recording.

With the automatic control methods, the frequency and amplitude of the current applied through the control circuit to vary the amplification gain are often to a certain extent superimposed on the impulses which are being recorded, thereby distorting the shape of the recorded oscillations and making a correct interpretation of the record difficult or sometimes impossible.

Furthermore, since all of the above control methods are based on changes of the operating point on the amplifying tube characteristic, which is effected by shifting the grid bias, these methods require the use of remote cut-off tubes, which are extremely sensitive to grid bias changes. This in turn necessitates a careful matching of tubes and causes considerable difficulties of adjustment when operating multichannel seismograph systems.

It is, therefore, an object of this invention to provide a seismograph system wherein the volume or amplitude of the oscillations or impulses to be recorded is controlled in a transmission circuit used to pass said impulses from the detector to the amplifier and recorder, whereby it becomes possible to operate the amplifier tubes at a constant bias.

It is also an object of this invention to provide a seismograph system comprising a transmission circuit having non-linear resistance characteristics for controlling the amplitude of the oscillations transmitted from the detector to the recorder.

It is also an object of this invention to provide for seismograph work a transmittion circuit comprising variable non-linear resistance elements, whereby the transmission factor of said circuit may be varied as a function of a controlling current supplied to said elements.

It is also an object of this invention to provide for seismograph work a transmission circuit wherein the above non-linear resistance units comprise copper-oxide rectifiers.

It is also an object of this invention to provide for seismograph work a system wherein the controlling current used to modify the resistance and/or the transmission factor of the circuit electrically connecting the detector to the recorder is varied as a function of the amplitude of the impulses passing therethrough, or as a function of time, or as a function of both said factors.

It is also an object of this invention to provide for seismograph work a system wherein voltage variations occurring in a controlling direct current used to modify the resistance and/or the transmission factor of a circuit electrically connecting the detector to the recorder do not affect or distort the characteristics of the alternating current impulses generated by the detector and passed through said circuit.

These and other objects of this invention will be understood from the following description taken with reference to the annexed drawings wherein.

Figure 5:
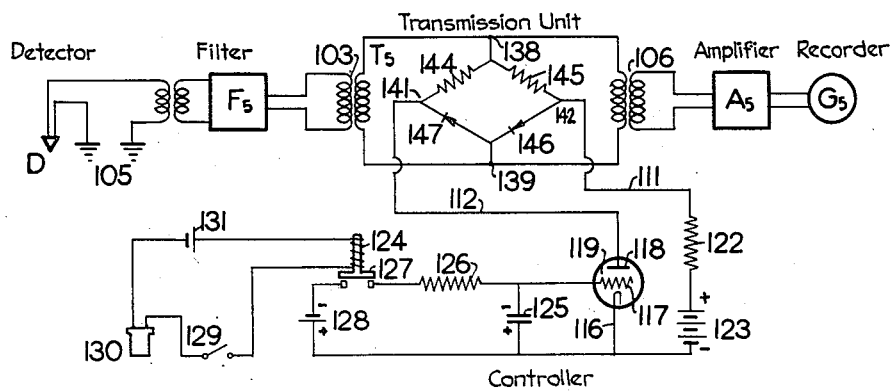
Figure 6:
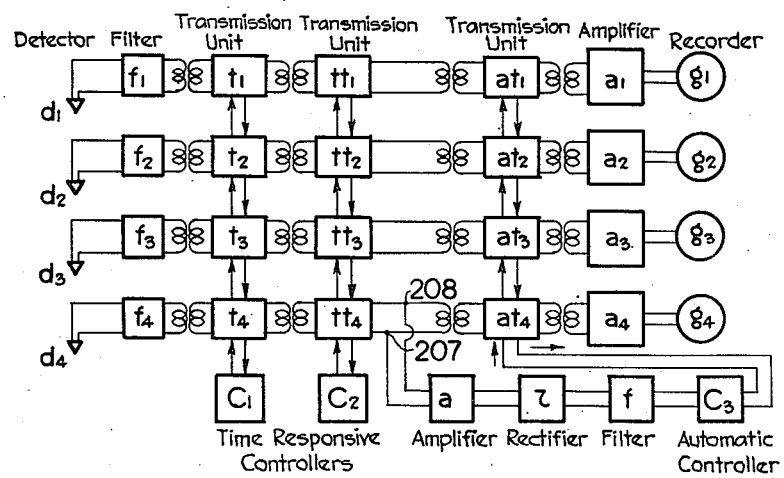

Fig. 5 is a diagram showing another embodiment of the present invention, wherein the transmission factor of a seismograph system is controlled as a function of time; and Fig. 6 is a diagram of an embodiment of the present invention wherein the transmission factor of a seismograph system is controlled both as a function of time and as a function of the amplitude of the oscillations passing therethrough.

Figure 1:
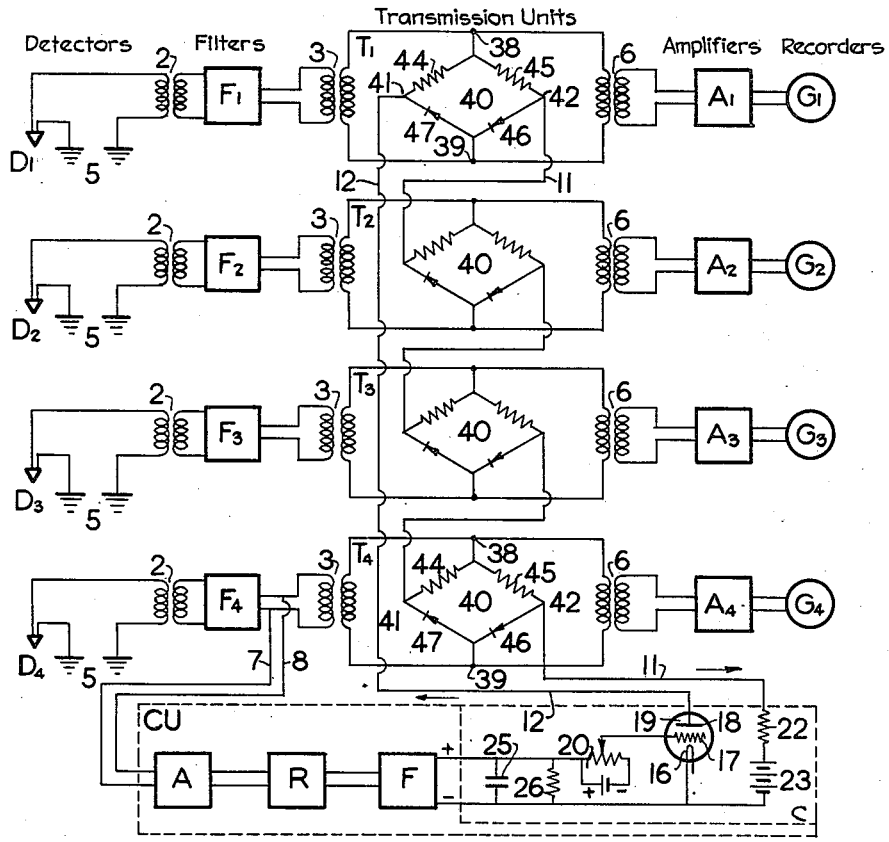
Fig. 1 is a diagram showing an embodiment of the present invention, wherein the transmission factor of a seismograph system is controlled as a function of the amplitude of the oscillations passing therethrough.

Referring to Fig. 1, $D_1$–$D_4$, inclusive, indicate detectors or seismometers placed in the ground, of which four are shown by way of illustration, although it is understood that any desired number, such as 8, 12, 32, 64, etc., may be used. These detectors are adapted to transform into electrical impulses the mechanical energy of the ground waves received by them when an explosive charge is detonated at a point selected at a desired distance from the detectors.

The detectors may be suitably grounded, as shown, for example, at 5, and are electrically or inductively connected by means of transformers 2, and through filters $F_1$–$F_4$, transformers 3, transmission units $T_1$–$T_4$ and amplifiers $A_1$–$A_4$, to the galvonometer or recorder elements $G_1$–$G_4$, respectively. Each detector, filter, transmission unit, amplifier and galvanometer string, for example, $D_1$—$F_1$—$T_1$—$A_1$—$G_1$, forms what is known as one channel. It is understood that each channel may comprise any desired number of amplification stages and filter units, of which only one is shown in the drawing for the sake of brevity.

Any of the channels, for example, the channel of detector $D_4$, as shown in Fig. 1, may be electrically connected by means of conductors 7 and 8, to a control unit CU. It is obvious that by extending conductors 7 and 8 and tapping the circuits of any other channels in a manner identical to that shown with regard to channel $D_4$, several or all of the channels may be, if desired, electrically connected to the control unit CU.

In describing the arrangement and operation of the control unit CU and of the transmission units $T_1$–$T_4$, it will be understood that only one control unit is used for all channels, and that the transmission units of all channels are alike, and are preferably connected to the control unit and to each other in series by means of conductors 11 and 12, as shown in Fig. 1.

The control unit CU, shown in Fig. 1, consists of an amplifier A, comprising any desired number of amplifying stages, and serving to amplify the impulses originating in detector $D_4$ when the latter is subjected to ground vibrations. The amplified impulses are then transmitted to the rectifier R, which may consist of any conventional arrangement giving full wave rectification.

The rectified current obtained from rectifier R is passed through a filter F, designed to smooth said current and to remove its harmonics, to the controller C, which is shown in Fig. 1 as consisting of that portion of the control unit CU which extends to the right of the filter F.

The controller C may comprise in its simplest form a vacuum tube 19 having a conventional filament 16 electrically connected to the negative terminal of filter F, a grid 17, and a plate 18, connected through a conductor 12 to the bridge circuit 40 of the transmission units, to be described below. The return lead 11 from said circuits is connected to the filament 16 of tube 19, and comprises a battery 23 providing through a resistance 22 the necessary positive plate potential for the plate 18.

The grid 17 of tube 19 is connected to the positive terminal of filter F and a variable source of potential generally indicated at 20 is interposed therebetween in such a manner as to oppose the potential impressed by the filter F between the grid and the filament of tube 19. A time constant circuit comprising, for example, a condenser 25 and a resistance 26 is connected across the leads between the terminals of the filter and the grid and filament of tube 19, respectively.

The transmission units $T_1$–$T_4$ are closed circuits connected by means of insulating transformers 3 and 6 into their respective channels to transmit the impulses generated by the detectors $D_1$–$D_4$ to the amplifiers $A_1$–$A_4$ and recorders $G_1$–$G_4$. The use of insulating transformers 3 and 6 is essential to prevent any crossing of energy between the channels.

Connected to the transmission units at points 38 and 39 located between the transformers 3 and 6, are variable resistance bridges generally designated at 40, which are also connected in series to each other and into the circuit of the controller through the lines 11 and 12, as shown at points 41 and 42.

The variable resistance bridges 40 each have four branches, of which two comprise two preferably equal constant or linear resistances 44 and 45, and two preferably identical non-linear resistances 46 and 47, the bridge being connected to the transmission unit at points (38 and 39) each located between two linear or two non-linear resistances, and into the controller circuit at points (41 and 42) each located between two different linear and non-linear resistances.

Any non-linear resistances, that is, resistances whose ability to pass an electric current is a function of the intensity of said current, such, for example, as vacuum tubes or copper-oxide rectifiers, may be used for the purposes of this invention. Since copper-oxide rectifiers in particular possess certain very desirable features, such as extremely permanent electrical characteristics, small physical size and adaptability for connection into bridge circuits, etc., the following description will be taken with regard to copper-oxide rectifiers, such for example, as those commercially known as "Varistors," manufactured by the Western Electric Company.

Figure 2:
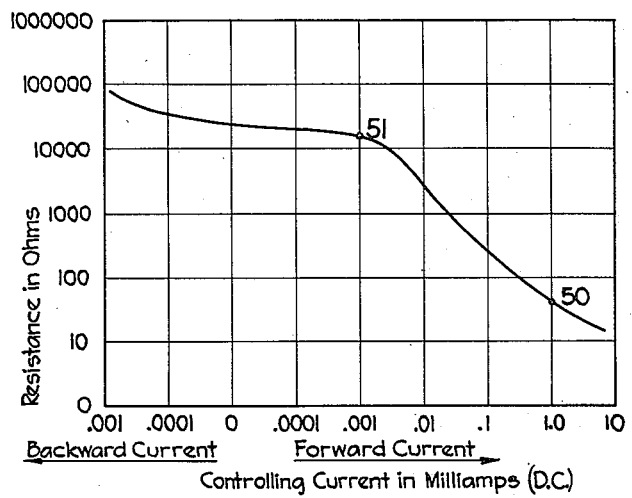
Fig. 2 is a graph showing a characteristic current-resistance curve of a copper-oxide rectifier.

Fig. 2 gives a characteristic dynamic current-resistance curve of such copper-oxide rectifiers, plotted on a logarithmic scale. From this curve it will be seen that for low intensities of current passed in a predetermined direction (so-called forward current), and for low values of current passed in the opposite direction (so-called backward current), the copper-oxide rectifier has extremely high values of resistance, while for higher intensities of current passed in the forward direction, it has relatively low values of resistance. Thus, for a forward current of 0.0001 milliampere intensity, a copper-oxide rectifier will have a resistance of about 30,000 ohms, while for a forward current of 1.0 milliampere this resistance will drop to a value of only about 45 ohms. The copper-oxide rectifiers are, for technical considerations, normally operated only on forward current accoding to the present invention.

The purpose of the variable or non-linear resistance bridges 40 connected across the transmission units $T_1$–$T_4$ is as follows:

As stated above, the transmission units serve as links for passing the electrical energy of the impulses generated by the detectors $D_1$–$D_4$ on to the recorders $G_1$–$G_4$. In other words, the energy delivered to the transmission units by means of the transformers 3 is passed further on by means of the transformers 6. If, however, a path is provided in the transmission units between the points 38 and 39 for by-passing a portion of said energy, only a fraction of the energy received at the input transformers 3 will be available for further transmission at the output transformers 6, the rest being lost or dissipated in the transmission unit itself. If the resistance value of the path 38—39 is high, only a small amount of the energy will be by-pased therethrough, while most of said energy will reach transformers 6 and pass on to the recorders $D_1$–$D_4$, the attenuation effect of the transmission units being small in such cases. If, on the contrary, the resistance value of the path 38—39 is low, most of the energy will be short-circuited therethrough, and the attenuation effect of the transmission units will be large in such cases.

If, therefore, the resistance of the variable or non-linear resistance bridges 40 is varied in such a manner as to have a small value when strong impulses, such as direct or refracted impulses, are delivered to the transformers 3, and a very high value when weak impulses, such as reflected impulses, are delivered to said transformers 3, it is clear that most of the energy of the strong impulses will be short-circuited through the bridges 40 and will be lost or attenuated in the transmission units, whereas the energy of the weak impulses will be transmitted to the transformer 6 and on to the recorder, with only a small loss or attenuation in the transmission circuit.

Based on the above-outlined properties of non-linear resistances, and operation of the transmission units and bridges 40, the operation of the present system as a whole is as follows:

Preliminary to firing the shot, the control circuit is connected, as stated above, to one or more detector channels, it being often preferable to effect this connection with the detector channel nearest the shot point.

The grid bias of the controller tube 19 is adjusted, by means of the variable source of E. M. F. 20, to such a negative value designated, for example, as $E_2$ that no current flows from the plate 18 through the series connected bridges 40 at a moment when $E_2$ is the only potential applied to the grid. In other words, the controlling forward current passing through the copper-oxide rectifiers 46 and 47 is at this moment equal to zero. The polarity of the E. M. F. source 20 is arranged so as to oppose the potential appearing at the output terminals of filter F, as indicated in Fig. 1.

When the ground oscillations generated by the shot arrive at the detector $D_4$ and are transformed into electrical impulses, these impulses are transmitted, through filter $F_4$ and transformer 3, to the transmission unit $T_4$. They are also transmitted, through conductors 7 and 8 to the control unit, where they pass through amplifier A, rectifier R and filter F, appearing finally as a rectified filtered direct current potential, designated, for example, as $E_1$, at the output terminals of filter F. The magnitude of the potential $E_1$ is, of course, a function of the intensity of the impulses generated by the detector $D_4$.

The potential $E_1$, being of opposite polarity to that of the potential $E_2$ of the E. M. F. source 20, will therefore act to decrease the negative bias impressed on the grid of the controller tube.

For example, in adjusting the value of the potential $E_2$, the latter may be given a magnitude approximately equal to that of potential $E_1$ expected at the terminals of the filter F at a moment when the latter deliver a current derived from rectifying the strongest direct or refracted impulses from detector $D_4$. The approximate value of such potential may be easily determined by preliminary tests or calibration. In such case, the negative bias applied to the grid 17 will be approximately zero ($E_2-E_1=0$) and the plate 18 will therefore deliver to the bridges 40 a relatively strong forward controlling current, which will cause the copper-oxide rectifiers to operate on a low-resistance point of their characteristic curve, as shown, for example, at 50 in Fig. 2.

These strong impulses which thus determine the operation of the controller, will therefore, when arriving at the transmitting units by way of transformers 3, be largely by-passed by the bridges 40, having at that time a low resistance, and will be transmitted to the recorder only in a considerably attenuated volume.

When, however, the potential appearing at the output terminals of filter F is that obtained from rectifying weak impulses generated by the detector $D_4$ upon the arrival thereto of weak reflected waves, this potential will obviously be lower than that of the E. M. F. source 20 ($E_1$). In such case, the bias applied to the grid 17 ($E_2-E_1$), although having an absolute value smaller than that obtainable when no impulses at all are received by the control unit, will still have a certain negative value. The plate or controlling current passed through the bridges 40 of the transmission units will therefore have at this moment a small value, and the copper-oxide rectifiers will accordingly operate on a high resistance point of their curve, as shown at 51 in Fig. 2. The resulting high resistance of the bridges will permit a large portion of the energy of the impulses received by the transmission units to be transmitted further through transformers 6 without substantial loss.

As explained above, the controlling current used to modify the resistance of the bridges 40 is a function of the rectified filtered electrical impulses ($E_1$) originating in the detectors. It is well known that in spite of the most thorough filtering processes, certain A. C. effects (so-called rectification ripple, harmonics, etc.) cannot be completely eliminated from rectified currents or voltages. These effects, if superimposed on the impulses transmitted from the detector to the recorder through the transmission units, would distort said impulses, thus affecting the shape and the amplitude of the wave images obtained in the recorder. It will be seen, however, that since the fixed resistances 44 and 45, on the one hand, and the non-linear resistances 46 and 47, on the other hand, are respectively equal to each other, the bridge 40 satisfies the equation:

(Resistance 45) × (resistance 47) =
(resistance 44) × (resistance 46)

whereby points 38 and 39 are always maintained at the same potential regardless of the variations of any potential applied at points 41 and 42. In other words, while variations of the intensity of the controlling current regulate the amount of A. C. energy derived from transformer 3 which is permitted to pass through the bridge 40, no energy derived from the controlling current supply is permitted to pass from the bridge 40 to the transformers 3 and 6 due to any variations in the potential of the controlling current source.

The balanced bridges 40 thus make it possible to use relatively weak rectification filters in the control unit, which in turn permits to achieve high speeds of reaction, since it is well known that strong filters are invariably associated with sluggishness of operation.

As seen from the graph of Fig. 2, each copper-oxide rectifier may have, for example, a resistance of about 30,000 ohms at zero controlling current. To double this value, two such rectifiers may be used in series, whereby the bridge 40 may be given an equivalent resistance of about 30,000 ohms at zero controlling current. The impedance of the windings of the transformers 3 and 6 may also be conveniently given a value of about 30,000 ohms. In this manner, the maximum transmission factor of the unit, that is, its transmission factor at a moment when a minimum of energy is by-passed by the bridge 40, very nearly approaches one-half. The minimum transmission factor, that is, the transmission factor of the unit when a maximum of energy is by-passed by the bridge 40, depends on the value of the resistances 44 and 45, and on maximum permissible value of the controlling current. Since the controlling current is furnished by the vacuum tube 19 of the controller, it is preferable from technical considerations to keep it at a low value, which permits the use of small size plate batteries, gives flexibility in tube selection, etc. If, for example the maximum controlling current is fixed at 12 milliamperes, and resistances 44 and 45 are each given a value of 50 ohms, the arrangement of Fig. 1 gives a minimum transmission factor of 1/200. The minimum relative transmission factor, which is the ratio of the minimum transmission factor to the maximum transmission factor is thereform about 1/100.

Figure 3:
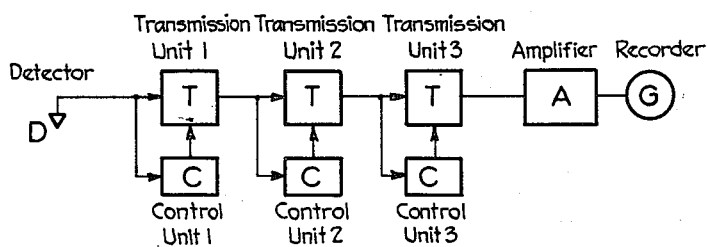
Fig. 3 is a diagram showing a variation of the system illustrated in Fig. 1.

Since, however, the amplitude of the strong impulses generated by the detectors may vary from that of the weak impulses by a factor as large as 100,000 or more, it may be desirable, in order to obtain the desired amplitude or volume control, to use several transmission units in series, each transmission unit being provided with a separate control unit. Such system is schematically shown in Fig. 3, wherein a single channel is shown for purposes of simplicity of illustration, it being understood that the arrangement of the transmission and of the control units is the same as in Fig. 1.

Figure 4:
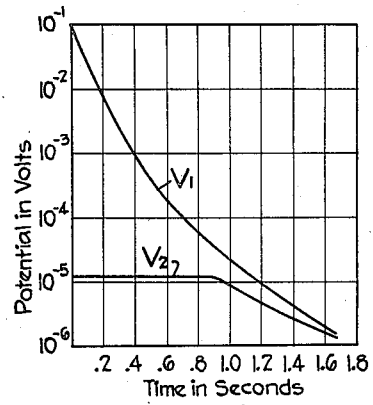
Fig. 4 is a graph showing the decay with time of the voltage envelope of the A. C. oscillations generated by the detector.

Since the A. C. impulses generated by the detectors are normally, first, the impulses from the strong direct or refracted seismic waves, and then the impulses from the weak reflected waves, it may be stated that the amplitude envelope of the A. C. impulses generated by the detectors is in general a curve decaying as a function of time, as shown at $V_1$ in Fig. 4.

If, however, the transmission factor of a transmission unit, or of a series of transmision units inserted between the detector and the recorder of each channel is raised at a rate substantially equal to that of the decay of the envelope of the A. C. impulses, the voltage transmitted to the amplifiers and the recorders may be kept at a substantially constant value, as shown at $V_2$ in Fig. 4, thus effecting the desired amplitude or volume control.

Since the transmission factor, as shown above, is a function of the controlling current passing through the bridges 40 of the transmission units, the above object may be achieved by varying the intensity of the control current not as a function of the amplitude or intensity of the impulses generated by the detectors, as described with regard to the system illustrated in Fig. 1, but as a function of time, as shown in the system illustrated in Fig. 5.

This embodiment is described for simplicity with regard to a single channel, comprising a detector $D_5$, filter $F_5$, transmission unit $T_5$, amplifier $A_5$, and recorder $G_5$, similar in all details to corresponding elements of Fig. 1, it being understood that any desired number of such channels may be used.

The controller comprises in this case a vacuum tube 119, which delivers to the transmission unit $T_5$ a controlling current through leads 111 and 112. The negative bias applied to the grid 117 is the instantaneous voltage to which a condenser 125, connected between the grid and the filament 116 of the tube, is charged by a cell 128 through a resistance 126.

The circuit comprising the cell 128, resistance 126 and condenser 125 is closed by a switch 127, operable either manually or magnetically, in which case the solenoid winding 124 of the switch may be connected, for example, into a firing circuit comprising the detonator 130 of the explosive charge used to generate the seismic waves, an electrical cell 131 and a switch 129, arranged so the closing of the switch 129 detonates said charge and at the same time closes the switch 127.

At the moment when the shot occurs, therefore, the voltage of the cell 128 is applied through the switch 127 and resistance 126, to the condenser 125, beginning to charge said condenser, the polarity of said charge being as indicated in the drawings. In the first instant, the charge on the condenser being zero, and the grid 117 being at the same potential as the condenser, namely, at zero potential, the plate current of the tube 119, that is, the forward controlling current, has a high value. The resistance of the bridge 140 is therefore low, and the strong direct or refracted impulses arriving at this time from the detector $D_5$ to the transmission unit $T_5$ are largely by-passed by said bridge, thus giving a low transmission factor.

As the condenser 125 is gradually charged to the potential of the cell 128, the negative bias applied to the grid 117 increases in value together with the charge on the upper plate of condenser 125, until at a certain time, depending on the values selected for the condenser 125 and the resistance 126, it becomes sufficiently high for entirely cutting off the plate current of tube 119. No controlling current flows then in the bridge circuit of the transmission unit, and the weak reflected impulses arriving at this time from the detector $D_5$ at the transmission unit $T_5$ are transmitted with a high or maximum transmission factor.

It has been found that in practice the best results may be obtained by combining in one system the control methods outlined with regard to Figs. 1 and 5.

As shown in Fig. 6, such system may comprise any desired number of channels (four channels being shown by way of illustration) having detectors $d_1$—$d_4$, filters $f_1$—$f_4$, time-responsive transmission units $t_1$—$t_4$, time-responsive transmission units $tt_1$—$tt_4$, volume-responsive transmission units $at_1$—$at_4$, amplifiers $a_1$—$a_4$ and recorders $g_1$—$g_4$, all transmission units being connected into their respective channels by means of insulating transformers and being similar to those described with regard to Figs. 1 and 5.

The controlling current for the transmission units $t_1$—$t_4$ and $tt_1$—$tt_4$ is provided by time-responsive controllers $C_1$ and $C_2$, respectively, these controllers being similar to those described in detail with regard to Fig. 5. The controlling current for the transmission units $t_1$—$t_4$ and $tt_1$—$tt_4$ is therefore a function of time.

The controlling current for the transmission units $at_1$—$at_4$ is supplied by automatic controller $C_3$, provided with an amplifier $a$, rectifier $r$ and filter $f$. The automatic volume-responsive controller $C_3$ is similar to that desscribed in Fig. 1, and the controlling current delivered thereby to the transmission units $at_1$—$at_4$ is therefore a function of the magnitude of the impulses generated by the detectors and passed, with suitable attenuation, through the time-responsive transmission units of the particular channel to which the input terminals of controller $C_3$ are connected, for example, at the output terminals of the transmission unit $tt_4$, as shown at 207 and 208.

The advantages of this method of control may be briefly summarized as follows:

As stated above, a detector generates and delivers to the input of a transmission unit. An A. C. voltage whose envelope decays with time from a value of, for example, $10^{-1}$ to a value of, for example $10^{-7}$ volts in a manner which depends on many factors encountered in seismology, but which may in general be represented by a curve similar to that of $V_1$ shown in Fig. 4. If a seismograph system is designed so that the normal voltage level for the input to the recorder's amplifiers $a_1$—$a_4$ is fixed, for example, to a value such as $10^{-5}$ volts, this will mean that such voltage will produce deflections of desired amplitude on the record, while all deflections larger than those corresponding to $10^{-5}$ volts will not be desirable, while all deflections smaller than those corresponding to $10^{-5}$ volts will be properly recorded without necessity of control.

Since the minimum relative transmission factor of each of, for example, units $t_1$ and $tt_1$ may be given, as shown above, a value of about 1/100, the combined minimum relative transmission factor of these two units in series will have a value of about 1/10,000. The units $t_1$ and $tt_1$ may, therefore, be easily adjusted in such a manner as to give an output voltage not exceeding the above normal voltage level by a factor of more than approximately 10.

Since this output voltage is the input voltage to the controller $C_3$, it will be seen that the transmission unit $at_1$ is controlled by a controlling current which is a function of the output voltage of the transmission unit $tt_1$, and thus only indirectly a function of time. Since the transmission factor of unit $at_1$ may be controlled, in a manner described with regard to Fig. 1, so as to vary in such manner as to keep the output of the unit $at_1$ constant at $10^{-5}$ volts while the output of unit $tt_1$ has any value exceeding $10^{-5}$ volts, it will be seen that the overall output voltage of the three transmission units will thus be maintained at the desired level and have the desired flat characteristic.

The effect, therefore, is exactly the same as if all transmission units were completely automatic, that is, of the type of unit $at_1$, whereas technically a considerable simplification of equipment is made posssible by having the automatic part, that is, controller $C_3$ and transmission units $at_1$-$at_4$, control a range of only from normal to about 10 times normal instead of a range of from normal to 10,000 normal.

It is understood that instead of the condenser-controlled time-responsive arrangement described hereinabove with regard to the system of Fig. 5, any other method of time-responsive arrangement to vary the bias of the controller grid, such, for example, as described in the co-pending applications Serial Nos. 280,766 and 280,767, filed on June 23, 1939, by J. P. Woods, may equally well be used in practicing this invention.

I claim as my invention:

1. In a seismograph system comprising a detector adapted to generate electric impulses and a recorder adapted to record said impulses, a plurality of series-connected non-linear resistance elements adapted to pass said impulses from the detector to the recorder, means for passing a controlling current through one of said elements, means for varying the intensity of said current as a function of time, whereby the resistance of said element to the impulses passing therethrough is varied as a function of the intensity of said current, means for passing a controlling current through another of said elements, and means for varying the intensity of said current as a function of the amplitude of the impulses passed through said first element, whereby the resistance of said second element to the impulses passing therethrough is varied as a function of said current.

2. In a seismograph system comprising a plurality of detectors adapted to generate electric impulses and a multistring recorder adapted to record said impulses, a plurality of closed circuits for the transmission of said impulses from the detector to the recorder, each of said circuits comprising transformers inductively linking said circuit to a detector and to one of the strings of the recorder, a non-linear resistance element shunting said circuit between said transformers, and single control means for passing a variable direct current through said non-linear elements in series, whereby the equivalent resistance of said circuits is varied as a function of the intensity of said current.

3. In a seismograph system comprising a plurality of detectors adapted to generate electric impulses and a multistring recorder adapted to record said impulses, a plurality of closed circuits for the transmission of said impulses from the detector to the recorder, each of said circuits comprising an input transformer inductively linking said circuit to a detector and an output transformer inductively linking said circuit to one of the strings of the recorder, a non-linear resistance element shunting said circuit between said transformers, and single control means for passing a variable direct current through said non-linear resistance elements in series, whereby the energy of the impulses transmitted in each of said circuits from the input transformer to the output transformer is varied as a function of the intensity of said direct current.

4. In a seismograph system comprising a plurality of detectors adapted to generate electric impulses and a multistring recorder adapted to record said impulses, a plurality of closed circuits for the transmission of said impulses from the detector to the recorder, each of said circuits comprising an input transformer inductively linking said circuit to a detector and an output transformer inductively linking said circuit to one of the strings of the recorder, a non-linear resistance element shunting said circuit between said transformers, means to produce a direct current varying as a function of time, and single control means for passing said variable direct current through said non-linear resistance elements in series, whereby the energy of the impulses transmitted in each of said circuits from the input transformer to the output transformer is varied as a function of the intensity of said direct current.

5. In a seismograph system comprising a plurality of detectors adapted to generate electric impulses and a multistring recorder adapted to record said impulses, a plurality of closed circuits for the transmission of said impulses from the detector to the recorder, each of said circuits comprising an input transformer inductively linking said circuit to a detector and an output transformer inductively linking said circuit to one of the strings of the recorder, a non-linear resistance element shunting said circuit between said transformers, means in circuit with at least one detector to produce a direct current varying as a function of the amplitude of the impulses generated by said detector, and single control means for passing said variable direct current through said non-linear resistance elements in series, whereby the energy of the impulses transmitted in each of said circuits from the input transformer to the output transformer is varied as a function of the intensity of said direct current.

6. In a seismograph system comprising a detector adapted to generate electrical impulses and a recorder adapted to record said impulses, a plurality of series-connected non-linear resistance elements adapted to pass said impulses from the detector to the recorder, means for passing a controlling current through one of said elements, means for varying the intensity of said current as a function of time, whereby the energy of the impulses passed by said element from the detector to the recorder is varied as a function of the intensity of said current, means for passing a controlling current through another of said elements, and means for varying the intensity of said current as a function of the amplitude of the impulses passed through said first element, whereby the energy of the impulses passed by said second element from the detector to the recorder is varied as a function of said current.

ALFRED J. HERZENBERG.